(12) United States Patent
Springett et al.

(10) Patent No.: US 6,886,811 B2
(45) Date of Patent: May 3, 2005

(54) PORTABLE DYNAMOMETER STATION WITH VEHICLE-MOUNTED LIFTING ASSEMBLY

(76) Inventors: David Roy Springett, 1901 Royal Oaks Dr., Sacramento, CA (US) 95815; Lee Paxton, 4946 Watt Ave., Suite 15, North Highlands, CA (US) 95660

( * ) Notice: Subject to any disclaimer, the term of this patent is extended or adjusted under 35 U.S.C. 154(b) by 0 days.

(21) Appl. No.: 10/421,332

(22) Filed: Apr. 23, 2003

(65) Prior Publication Data

US 2004/0211950 A1 Oct. 28, 2004

(51) Int. Cl.$^7$ ............................................. B66D 1/00
(52) U.S. Cl. ........................ 254/264; 212/180; 414/542
(58) Field of Search .................... 254/264; 212/180, 212/179; 414/542; 73/1.08

(56) References Cited

U.S. PATENT DOCUMENTS

| | | | |
|---|---|---|---|
| 3,308,845 A | | 3/1967 | Bellas et al. |
| 3,572,513 A | * | 3/1971 | Tantlinger et al. .......... 212/180 |
| 3,697,123 A | | 10/1972 | Gyrynuk |
| 3,861,204 A | * | 1/1975 | Fillingim ..................... 73/117 |
| 3,940,978 A | * | 3/1976 | Akkerman et al. ........... 73/117 |
| 4,016,754 A | | 4/1977 | Wiss |
| 4,094,419 A | * | 6/1978 | Kruger ....................... 414/133 |
| 4,230,358 A | | 10/1980 | Legueu |
| 4,362,329 A | | 12/1982 | Laube et al. |
| 4,688,308 A | | 8/1987 | Alvarez |
| 4,981,318 A | | 1/1991 | Doane et al. |
| 5,833,294 A | | 11/1998 | Williams et al. |
| 5,844,145 A | * | 12/1998 | D'Angelo ................ 73/862.18 |
| 5,862,926 A | * | 1/1999 | Johnson ..................... 212/180 |
| 6,044,696 A | * | 4/2000 | Spencer-Smith ............. 73/117 |
| 6,123,547 A | * | 9/2000 | Teresi ......................... 434/61 |
| 6,131,454 A | * | 10/2000 | Kopp et al. .................. 73/457 |
| 6,505,503 B1 | * | 1/2003 | Teresi et al. ................. 73/117 |
| 6,691,573 B2 | * | 2/2004 | Silvagi et al. ............... 73/571 |
| 2002/0018982 A1 | * | 2/2002 | Conroy ....................... 434/62 |

* cited by examiner

*Primary Examiner*—Emmanuel Marcelo
(74) *Attorney, Agent, or Firm*—Daniel P. Maguire (57) ABSTRACT

A portable dynamometer station with a vehicle mounted lifting assembly is disclosed. It comprises (a) a vehicle, such as a bus, for transporting the dynamometer, (b) a dynamometer with associated monitoring equipment, and (c) a lifting assembly mounted in the vehicle, for transporting the dynamometer from the vehicle to the ground.

The lifting assembly includes (i) an upper support beam, (ii) a lower support beam, (iii) a moving trolley on the lower support beam, (iv) a first hydraulic cylinder for moving the lower support beam and the trolley relative to the upper support beam, (v) a second hydraulic cylinder for raising and lowering the dynamometer or other load from the moving trolley, and (vi) a series of pulleys and cables for movement of the lower support beam, the moving trolley, and the dynamometer or other load.

13 Claims, 11 Drawing Sheets

PORTABLE DYNAMOMETER STATION WITH VEHICLE-MOUNTED LIFTING ASSEMBLY

BACKGROUND OF THE INVENTION

There is increasing concern in the United States about the effect of vehicle emissions on air quality. A number of states and local governments have implemented mandatory emissions testing programs to help identify vehicles that are releasing unacceptable levels of harmful emissions.

To conduct emissions testing, dynamometers are typically used to hold the vehicle stationary while its wheels turn. Dynamometers are large and bulky devices, and therefore in the past they have been permanently installed in a testing facility or service station. Thus, to have a vehicle tested, a driver would typically need to travel to the testing facility. Especially for drivers in rural or underserved areas, this can be a very inconvenient trip, since the testing facility may be many miles away.

Thus there is a need for a portable dynamometer station, to reduce the inconvenience to drivers, and to make emission testing available in otherwise inaccessible areas.

SUMMARY OF THE INVENTION

The present invention is portable dynamometer station with a vehicle mounted lifting assembly. It comprises (i) a vehicle, such as a bus, for transporting the dynamometer, (ii) a dynamometer with associated monitoring equipment, and (iii) a lifting assembly mounted in the vehicle, for transporting the dynamometer from the vehicle to the ground.

The lifting assembly includes (i) an upper support beam, (ii) a lower support beam, (iii) a moving trolley on the lower support beam, (iv) a first hydraulic cylinder for moving the lower support beam and the trolley relative to the upper support beam, (v) a second hydraulic cylinder for lifting and lowering the dynamometer or other load from the moving trolley, and (vi) a series of pulleys and cables for movement of the lower support beam, the moving trolley, and the dynamometer or other load.

Using this lifting assembly, a standard dynamometer can be lifted from the inside of a modified bus or other vehicle, moved out of the vehicle door, and lowered to the ground. Once lowered, the dynamometer can be set up and used, thus creating a completely portable emissions testing station.

BRIEF DESCRIPTION OF THE DRAWINGS

FIG. 11 is a cross-sectional view taken along line 11—11 of FIG. 8.

DETAILED DESCRIPTION

The present invention is portable dynamometer station with a vehicle mounted lifting assembly. It comprises (i) a vehicle 10, such as a bus, for transporting the dynamometer, (ii) a dynamometer 20 with associated monitoring equipment and (iii) a lifting assembly 30 mounted in the vehicle 10, for transporting the dynamometer 20 from the vehicle to the ground. Once transported to the ground, the dynamometer is ready for substantially immediate use.

The vehicle 10 can be a transit bus, or any other vehicle of sufficient size to contain the dynamometer. The vehicle needs an opening 16 for loading and unloading, and if a standard intra-city transit bus is used, its rear door can be used for this purpose. See FIGS. 2-6. The vehicle may have pedestals 12, 14 attached to internal pillars to support the weight of the lifting assembly and dynamometer. These pedestals 12, 14 with integral pillars can placed at both sides of the opening 16, a shown in FIGS. 1–6. Additionally, a pillar with a pedestal can be placed at the rear of the assembly to provide support from both sides.

The height of the pedestals 12, 14 can be controlled by hydraulic cylinders, so that the vehicle can be selectively raised or lowered to create a level environment for loading and unloading, even if the ground outside is not perfectly level. The vehicle may also have a leveling indicator, similar to a carpenter's level, to visually indicate whether the vehicle is level or not.

The vehicle also may have a generator, to produce electricity for operating the lifting assembly. Additionally, it may have an electrical hookup to draw power from nearby sources, if they are available.

To assist the operators in testing vehicles using the dynamometer, the vehicle may be fitted with a testing work station, including a table or desk, along with computers for receiving and analyzing test results. The vehicle may also have communications means, such as a satellite hookup or telephone, to transmit testing data to and from the portable station. More particularly, the present invention may be used with the portable satellite stand of application Ser. No. 09/957,949.

The dynamometer 20 can be purchased from commercial manufacturers. So that it can be lifted in and out of the vehicle, the dynamometer 20 can be modified to have eyelets or other attachment means welded or otherwise fastened to its upper surface. In operation, these attachments can be connected to the cables that are used to lift or lower the dynamometer 20. See FIGS. 2–6. The dynamometer 20 may also have a second eyelet or attachment means, and when a guiding rod is attached to this second attachment means, a user can guide the dynamometer 20 as it is being lowered and raised, to prevent it from rotating or otherwise moving laterally while it is being deployed. Of course, a user can accomplish the same result just by holding the dynamometer 20 as it is being raised or lowered, but it may be safer to use a guiding rod to provide spatial separation between the user and the moving dynamometer 20.

The dynamomter may have a standard processing unit for displaying and analyzing the results of the emissions testing.

Figure 1:
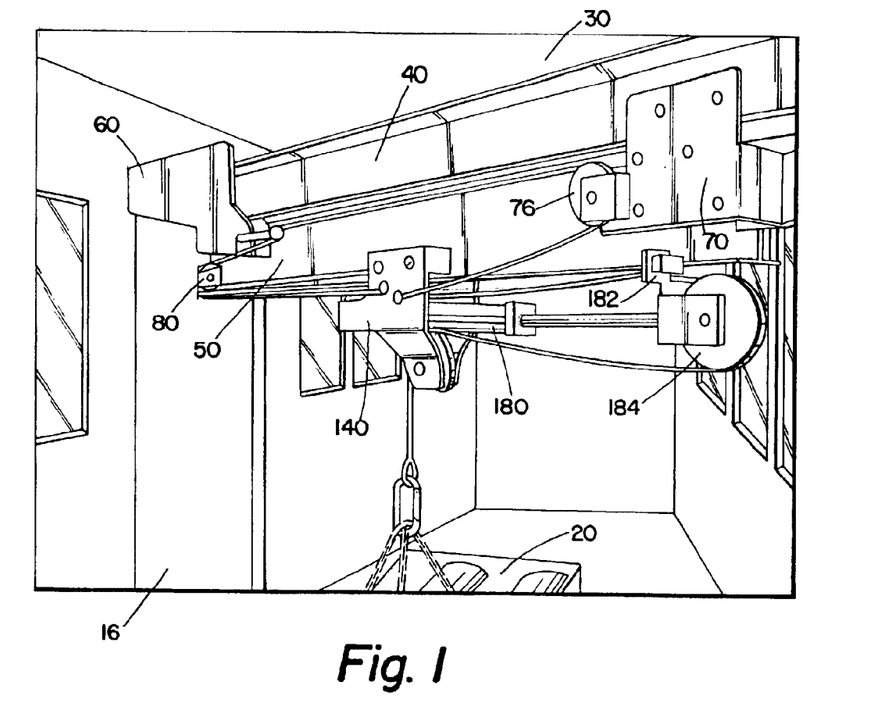
FIG. 1 is a perspective view from the front of the inside of the vehicle showing the lifting assembly and a portion of the dynamometer according to an embodiment of the present invention.
Figure 2:
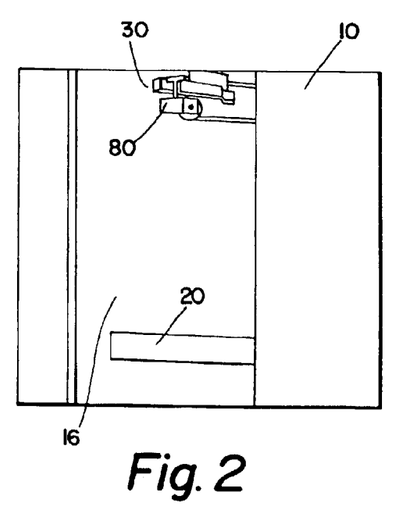
FIG. 2 is a perspective view of the side of the vehicle showing the dynamometer being moved out of the vehicle.
Figure 2:
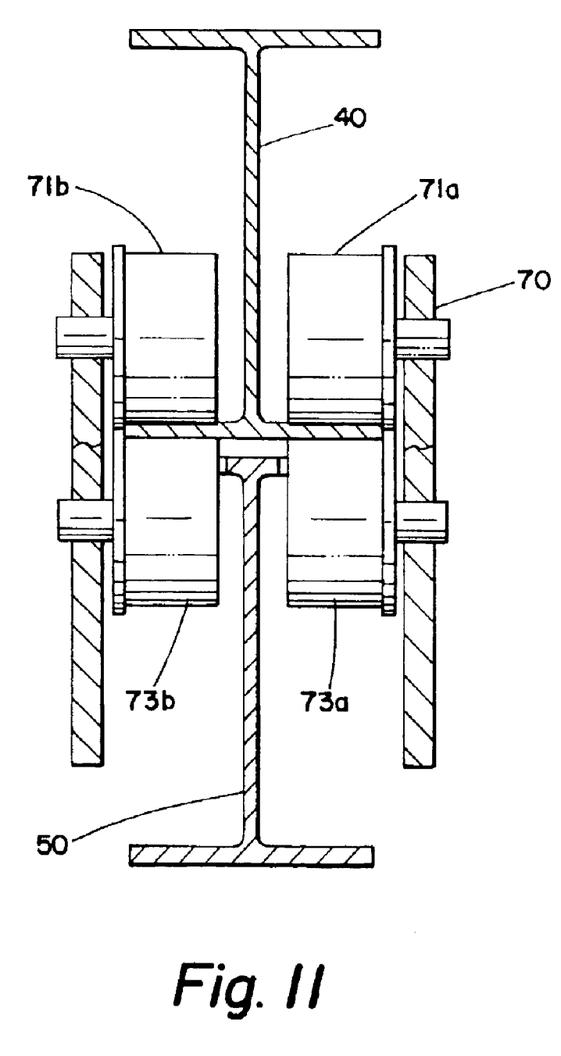
Figure 3:
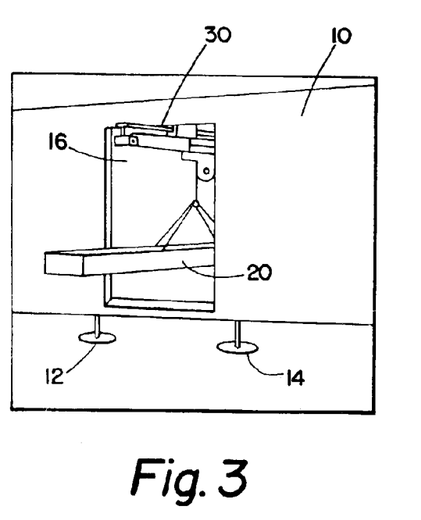
FIGS. 3–6 are also perspective views showing the progressive movement of the dynamometer as it lifted out of the vehicle.
Figure 4:
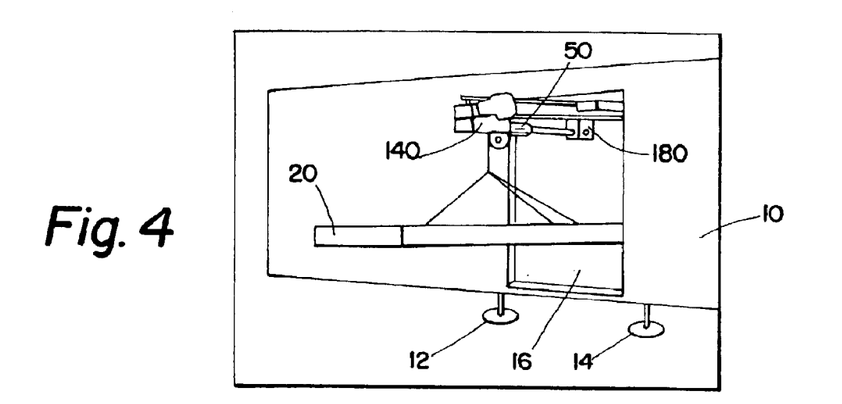
Figure 5:
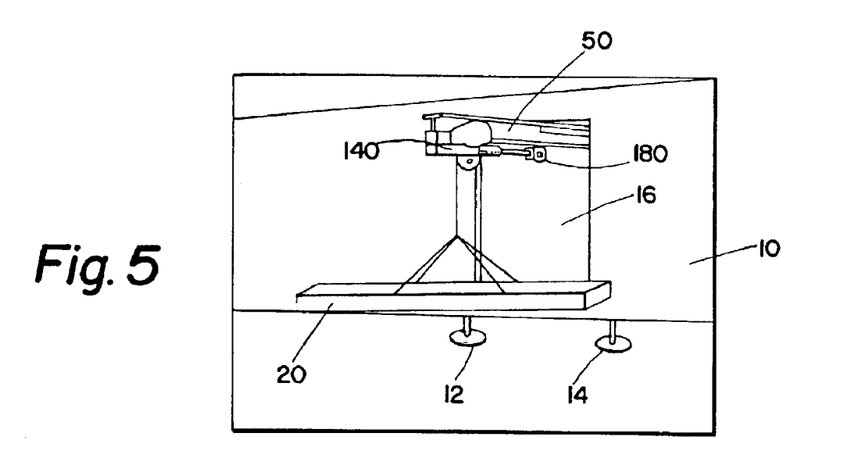
Figure 6:
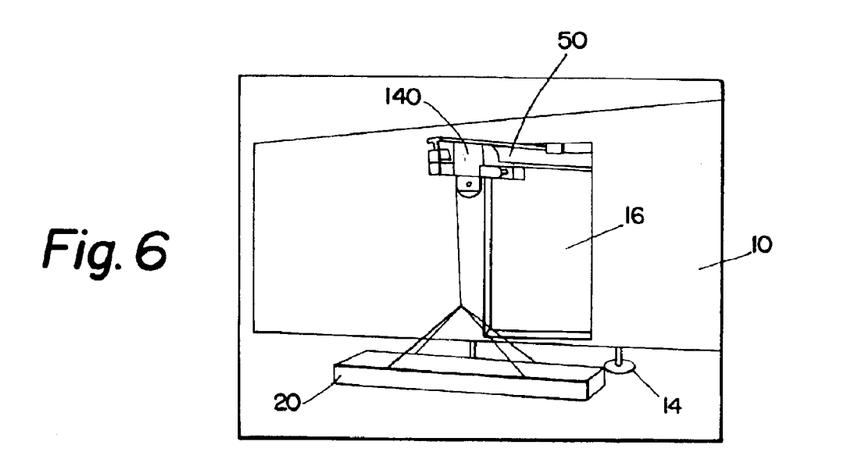

The lifting assembly 30 raises the dynamometer 20 from the floor of the vehicle 10, then transports the dynamometer out of the opening 16, and then lowers the dynamometer 20 to the ground where it can be readied for use. See FIGS. 2–6. As shown in FIG. 1, the lifting assembly can be positioned diagonally across the interior of the vehicle, with one end that can extend out of the opening 16. See also FIGS. 4, 5, and 6.

The primary components of the lifting assembly are: (i) an upper support beam 40, (ii) a lower support beam 50, (iii) a main support 60, (iv) a beam anchor 70, (v) a lower support beam cap 80, (vi) a lower beam moving system, (vii) a trolley moving system, and (viii) a load moving system.

Figure 7:
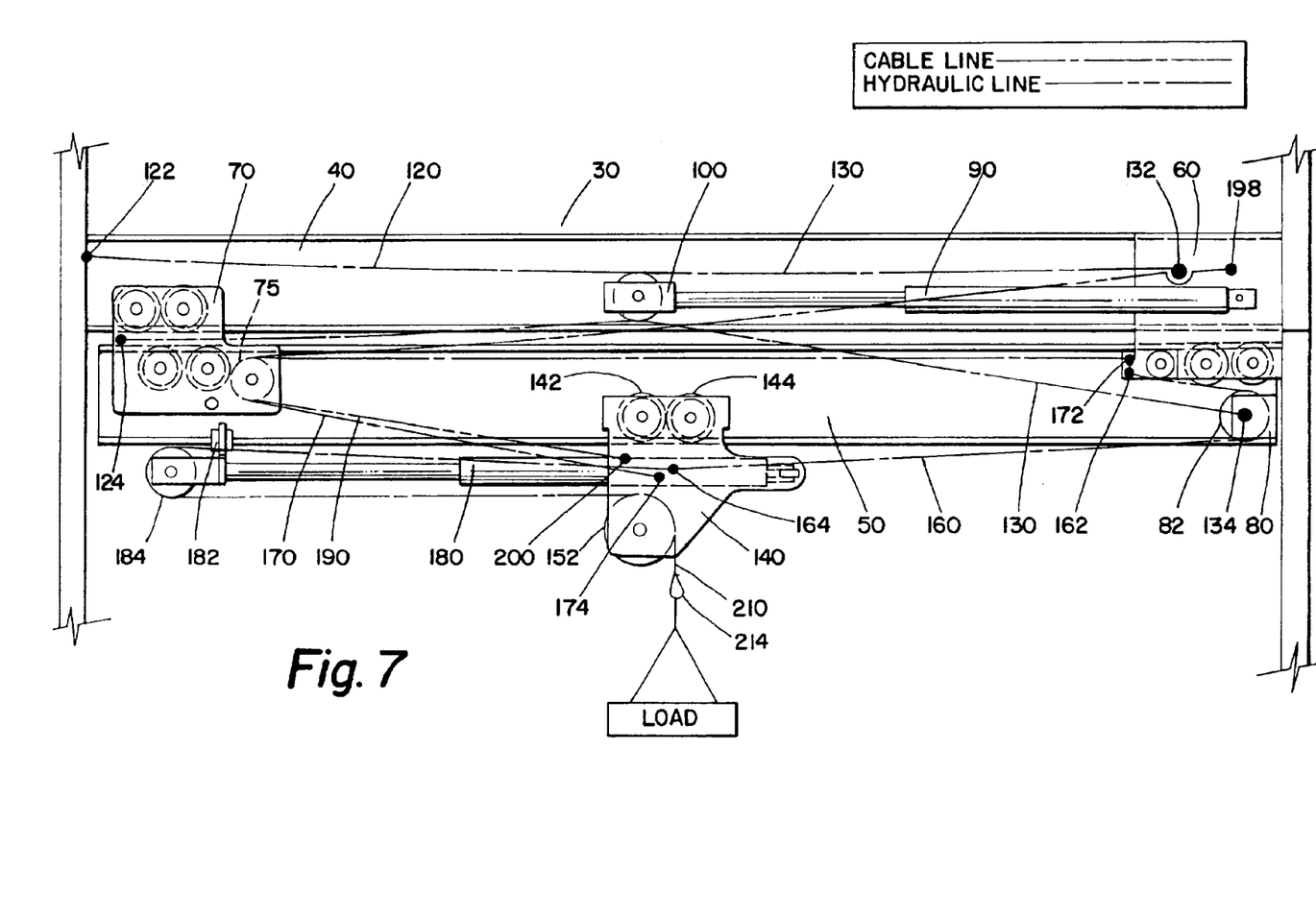
FIG. 7 is a side view of a lifting assembly according to the present invention.
Figure 8:
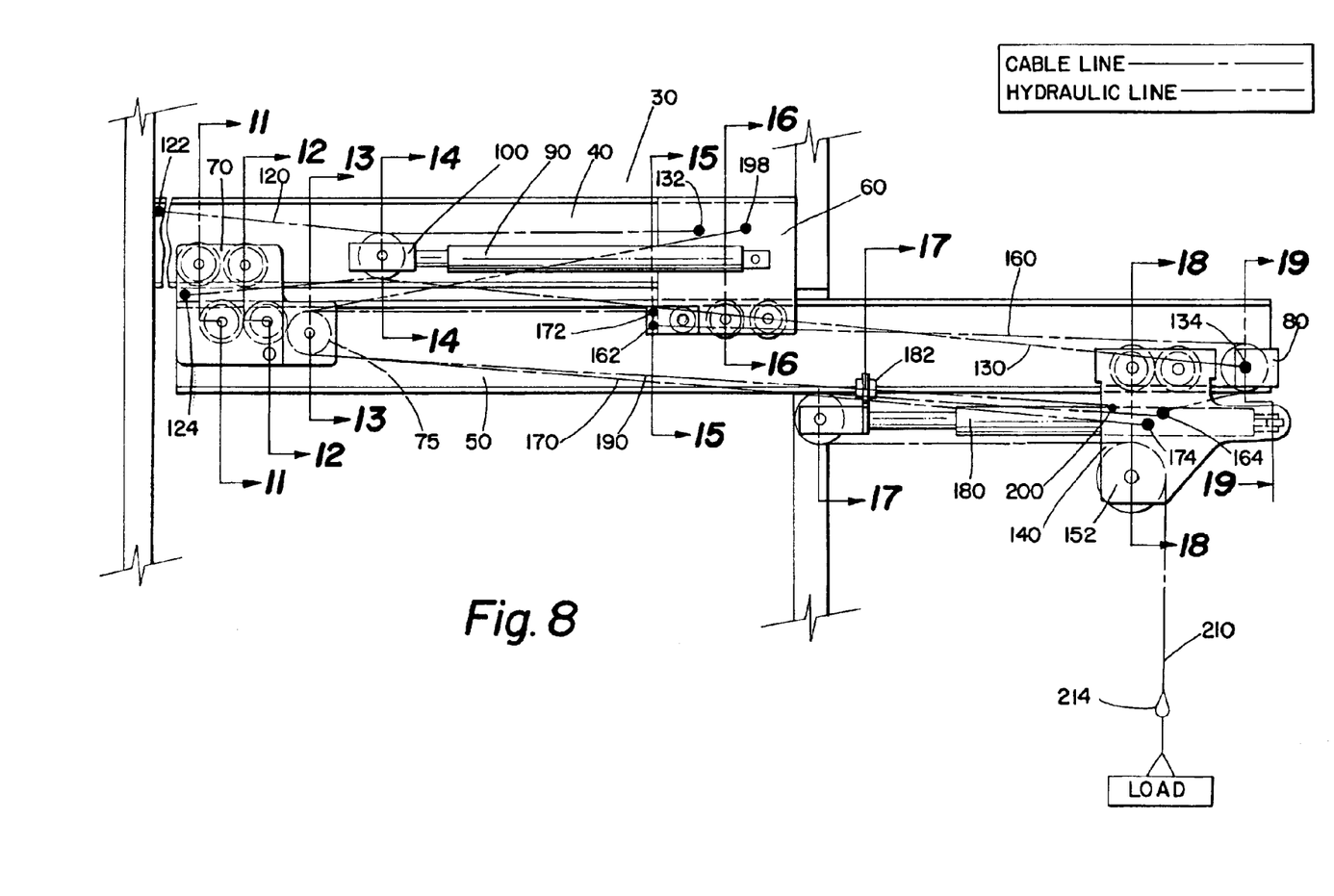
FIG. 8 is another side view of a lifting assembly according to the present invention, with the lower support beam extended.
Figure 9:
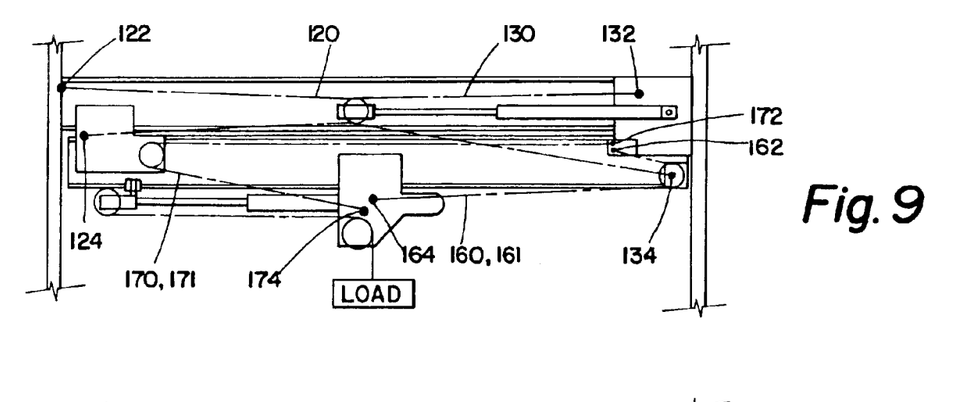
FIG. 9 is simplified side view of a lifting assembly according to the present invention, emphasizing the cables that move the lower support beam, the moving trolley, and the dynamometer or other load.
Figure 10:
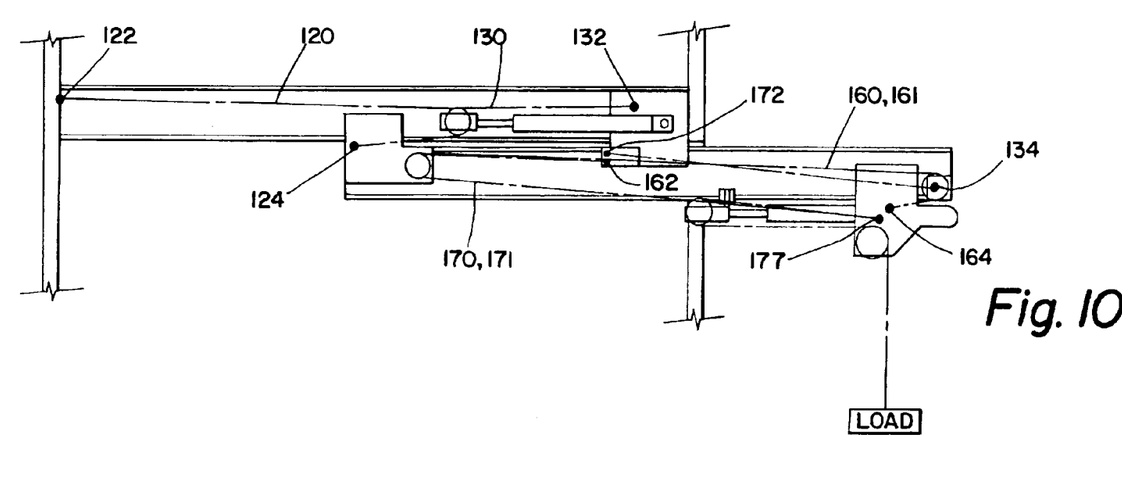
FIG. 10 shows the same view as FIG. 9, with the lower support beam extended.

As shown best in FIGS. 1, 7, 8, the upper support beam 40 is an I-beam which sits atop the lifting assembly 30. It does not move relative to the vehicle, and its weight may be supported by the pedestals 12, 14. It may be made of aluminum or other suitable materials.

Just underneath the upper support beam 40 is the lower support beam 50, as shown best in FIGS. 1, 7, and 8. The lower support beam 50 is also an I-beam, which can be made of aluminum, but this beam moves relative to the upper support beam 40 and thus relative to the vehicle. More particularly, the lower support beam extends out of the opening 16, as explained below in the section pertaining to the lower beam moving system. See FIGS. 4, 5, and 6.

Figure 16:
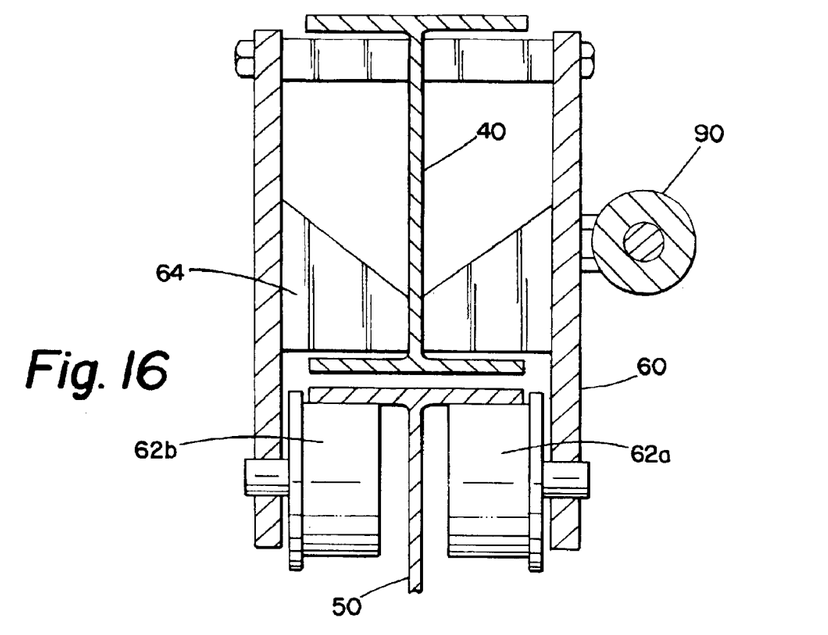
FIG. 16 is a cross-sectional view taken along line 16—16 of FIG. 8.
Figure 17:
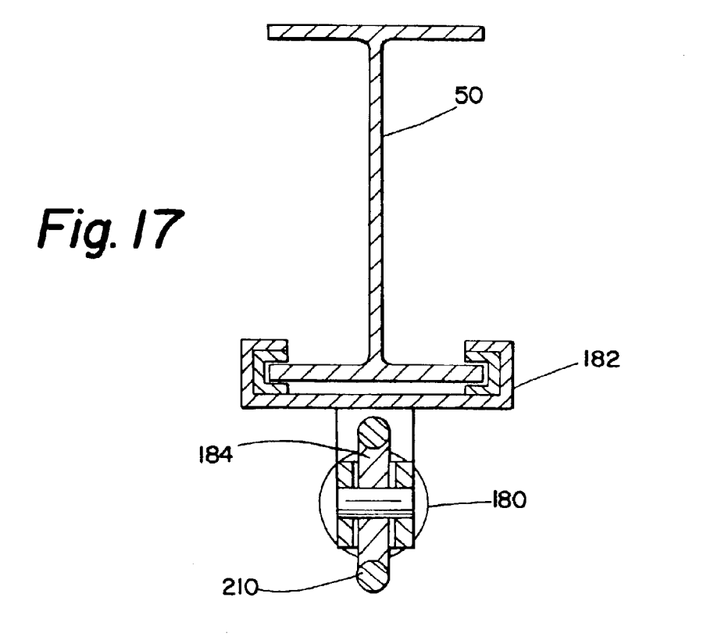
FIG. 17 is a cross-sectional view taken along line 17—17 of FIG. 8.
Figure 18:
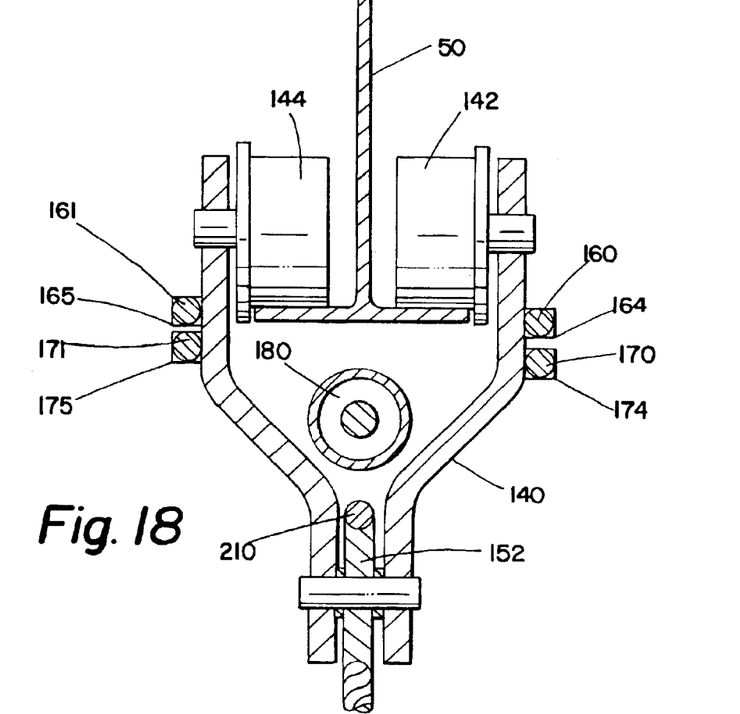
FIG. 18 is a cross-sectional view taken along line 18—18 of FIG. 8.
Figure 21:
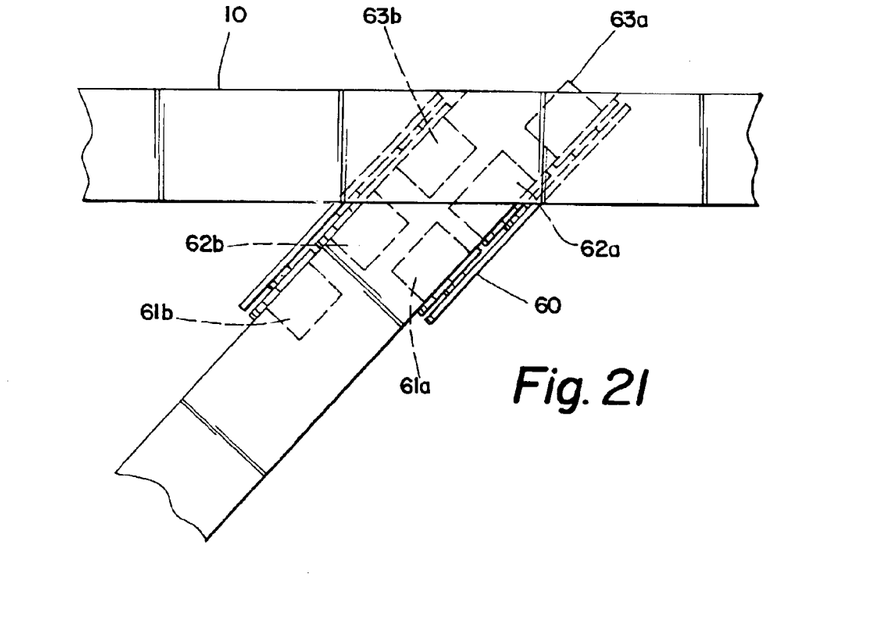
FIG. 21 is a top view of a main support according to an embodiment of the present invention.

The main support 60 anchors the upper support beam 40 to the vehicle 10, and also facilitates movement of the lower support beam 50. See FIG. 1. As shown in FIG. 21, the main support 60 has wheels 61a, 61b, 62a, 62b, 63a, 63b, and the lower support beam 50 rolls on these wheels as it travels in and out of the opening 16. See FIG. 16. The main support 60 has a cross-stabilizer 64 that grips the upper support beam 40. See FIG. 16.

At one end of the lower support beam 50 there is a beam anchor 70. See FIG. 1. The beam anchor is fixed to the lower support beam 50, and has wheels 71a, 71b, 72a, 72b, 73a, 73b, 74a, 74b which allow the lower support beam to move relative to the upper support beam. As shown in FIGS. 8, 11, 12, and 20, two pairs of these wheels (71a, 71b, 72a, and 72b) fit onto the upper support beam 40, and two pairs (73a, 73b, 74a, and 74b) fit onto the lower support support beam 50.

The beam anchor 70 has a pulley assembly 75 that contains pulleys that are used to move the trolley 140. See FIGS. 7, 8, and 13. The trolley moving system is explained below.

Figure 13:
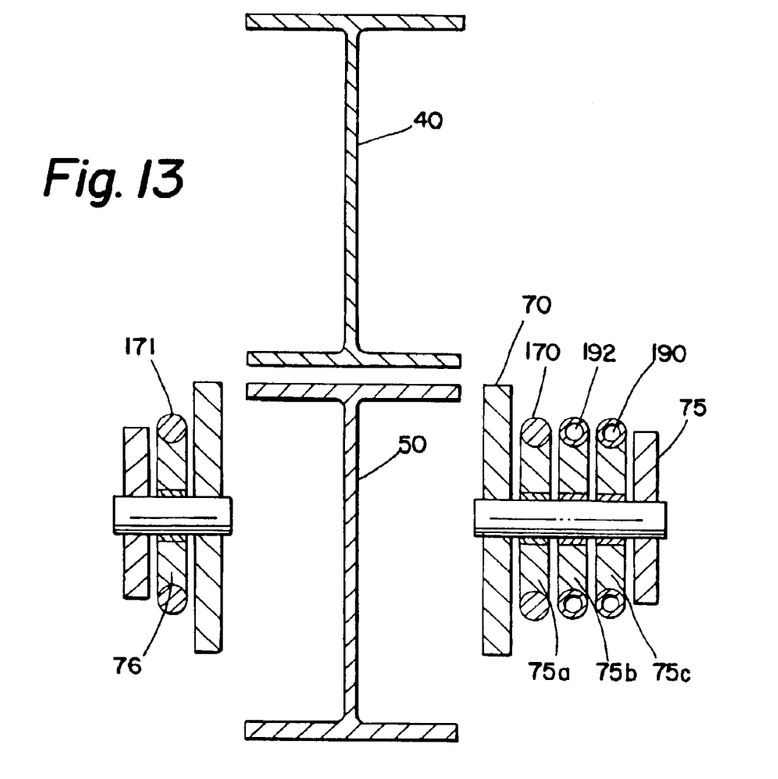
FIG. 13 is a cross-sectional view taken along line 13—13 of FIG. 8.

The pulley assembly 75 straddles the lower support beam 50 (see FIG. 13). One side, the pulley assembly has a first beam anchor cable pulley 75a, a first beam anchor hydraulic pulley 75b, and second beam anchor hydraulic pulley 75c. See FIG. 13. One the other side, the pulley assembly has a second beam anchor cable pulley 76. See FIG. 13. These cable pulleys hold the cables that cause the trolley 140 to move, and these hydraulic pulleys hold the hydraulic cables that power the load cylinder and rod 180. See FIG. 13.

Figure 12:
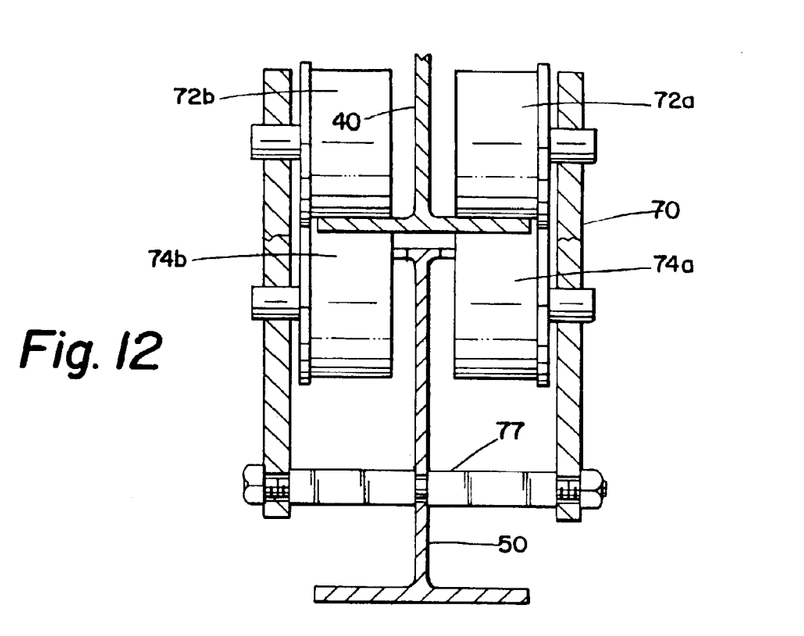
FIG. 12 is a cross-sectional view taken along line 12—12 of FIG. 8.

As shown in FIG. 12, the beam anchor 70 has a beam anchor cross-strut 77 that helps to stabilize the beam anchor 70 on the lower support beam 50.

Figure 19:
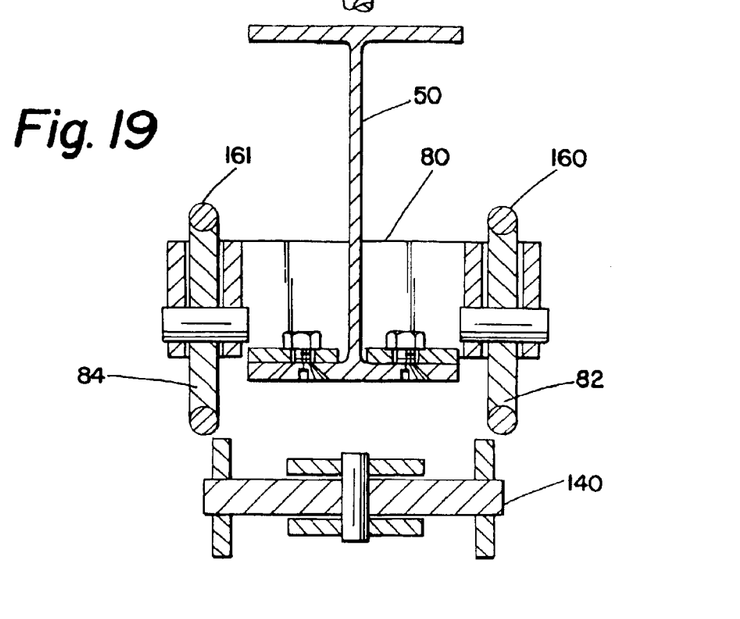
FIG. 19 is a cross-sectional view taken along line 19—19 of FIG. 8.
Figure 20:
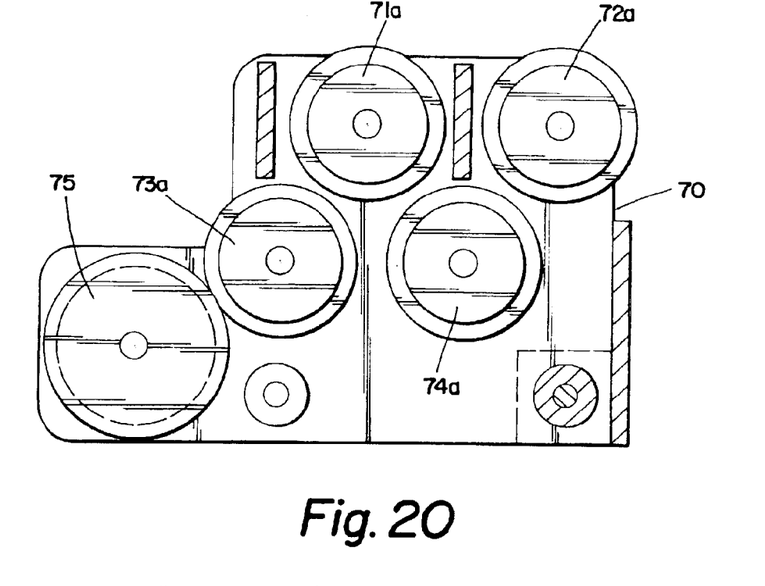
FIG. 20 is a side view of a beam anchor according to an embodiment of the present invention.

At one end of the lower support beam 50 there is a lower support beam cap 80. See FIGS. 1, 2, 7, 8, and 19. The lower support beam cap 80 has two pulleys, 82 and 84, and these pulleys hold the cables that extend the trolley 140 out of the vehicle 10. See FIG. 19. The two pulleys are on opposite sides of the lower support beam 50. See FIG. 19.

The lower beam moving system is an assembly of a cylinder, pulleys, and cables that allow the lower beam to extend and retract for unloading of the dynamometer.

A hydraulic cylinder, called the extension hydraulic cylinder 90 for purposes of this patent, is used to extend and retract the lower beam. See FIGS. 7, 8, 14, and 16. As explained below, it is also used to extend and retract the moving trolley 140. The extension hydraulic cylinder is nested on one side of the upper support beam, as shown in FIGS. 7, 8, 14, and 16. The extension hydraulic cylinder 90 should have a sufficient psi rating to move the lower support beam and moving trolley, and in one embodiment, this cylinder can be purchased from Lion Hydraulics, 2038 Colins Blvd, Austell, Ga., 30001, model number 639179 (Lion 30TL30-150). The hydraulic pressure for this cylinder is developed by a 24 V DC electric motor and pump connected to a hydraulic reservoir, and all of the components of the hydraulic system are installed on the vehicle. Controls for the extension hydraulic cylinder 90 may also be in the vehicle. In one embodiment, the rod of the extension hydraulic cylinder 90 moves 27 inches, which as explained below, can translate into 108 inches of movement for the moving trolley 140.

Figure 14:
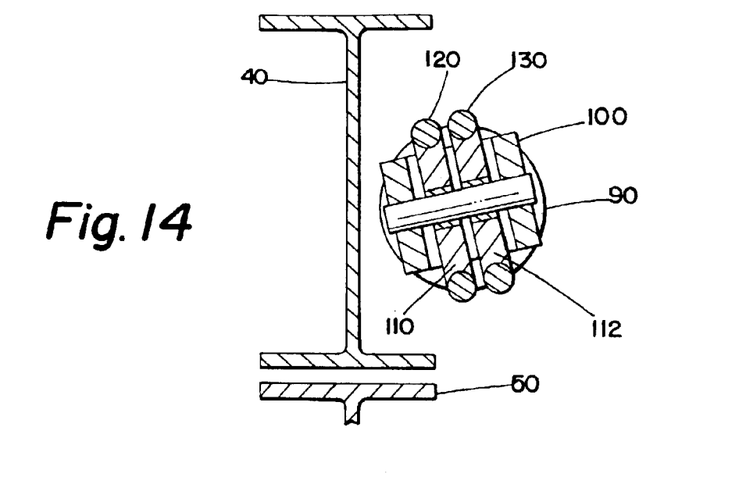
FIG. 14 is a cross-sectional view taken along line 14—14 of FIG. 8.
Figure 15:
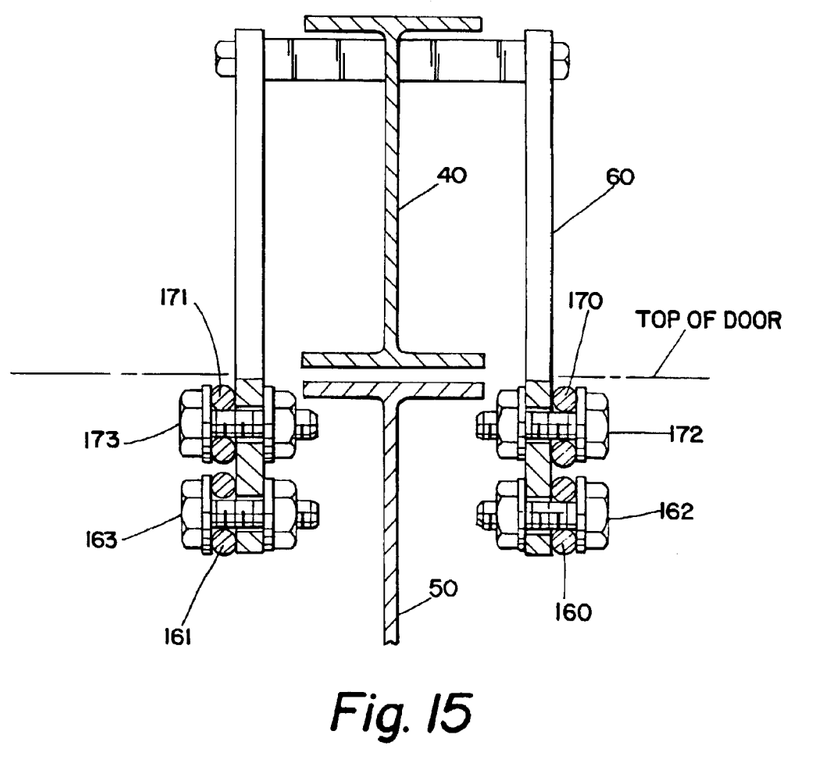
FIG. 15 is a cross-sectional view taken along line 15—15 of FIG. 8.

At the end of the rod of the extension hydraulic cylinder 90, there is the extension hydraulic cylinder pulley housing 100, which provides support for the extension hydraulic cylinder pulleys 110, 112, See FIGS. 7, 8, and 14. These pulleys are used in the extension and retraction of the lower support beam 50.

A lower support beam extension cable 120 is used to extend the lower support beam 50 out of the opening 16. See FIGS, 7, 8, 9, 10, and 14. This cable 120 has two anchor points, the lower support beam extension cable first anchor point 122, and the lower support beam extension cable second anchor point 124. As shown on FIGS., 7, 8, 9, and 10, the first anchor point 122 is located on the upper support beam, and the second anchor point 124 is located on the beam anchor 70. The lower support beam extension cable 120 extends from the first anchor point 122 through one of the extension hydraulic cylinder pulleys 110 to the second anchor point 124. See FIGS., 7, 8, 9, 10, and 14.

To extend the lower support beam 50, the extension hydraulic cylinder 90 retracts. Since the lower support beam extension cable first anchor point 122 is fixed on the immovable upper support beam 40, the pressure created by the retraction of the extension hydraulic cylinder 90 causes the lower support beam extension cable 120 to pull the second anchor point 124, which causes the anchor beam 70 and therefore the lower support beam 50 to move out of the opening 16.

Because of the action of the extension hydraulic cylinder pulley 110, for every inch the extension hydraulic cylinder 90 retracts, the lower support beam 50 travels two inches.

Retraction of the lower support beam 50 is analogous to extension. A lower support beam retraction cable 130 is anchored at two points: lower support beam retraction cable first anchor point 132, and the lower support beam retraction cable second anchor point 134. See FIGS. 7, 8, 9, 10, and 14. The first retraction anchor point 132 is located on the immovable upper beam, and the second retraction anchor point 134 is located on the end of the lower support beam 50, distal from the the lower support beam extension cable first anchor point 122, and the lower support beam extension cable second anchor point 124. See FIGS. 7, 8, 9, and 10. The lower support beam retraction cable 130 extends from the first anchor point 132 through one of the extension hydraulic cylinder pulleys 112 to the second anchor point 134. See FIGS., 7, 8, 9, 10, and 14.

When the extension hydraulic cylinder 90 extends, the lower support beam retraction cable 130 pulls the second anchor point 134 and hence the attached lower support beam back into the vehicle 10. Because of the action of the extension hydraulic cylinder pulley 112, for every inch the extension hydraulic cylinder 90 extends, the lower support beam 50 travels two inches.

Besides the lower beam moving system, there is also a trolley moving system. This system includes the moving trolley 140, which rides on the lower support beam 50. See FIGS. 1, 7, 8, 9, 10, and 18. The moving trolley 140 has four wheels 142, 144, 146, 148 that allow it to move relative to the lower support beam 50. The moving trolley 140 also has a load pulley 152 that is used in raising or lowering the load, i.e. the dynamometer.

As the lower support beam 50 moves relative to the upper support beam 40, so too the moving trolley 140 travels relative to the lower support beam 50. Thus, as the lower support beam 50 is extending from the upper support beam 40, the moving trolley is also moving outwards along the lower support beam 50. As a result, a 27 inch movement of the extension hydraulic cylinder 90 results in a 54 inch extension of the lower support beam 50, which in turn results in a net 108 inch movement of the moving trolley 140. With this extension capability, the present invention is able to transport a large dynamometer completely out of the vehicle to the ground.

To cause the moving trolley 140 to travel along the lower support beam 50, a system of cables and pulleys are used. For extending the moving trolley 140 outwards, there are two moving trolley projection cables 160, 161, one on each side of the assembly. See FIGS. 7, 8, 9, and 10. These cables are anchored with two sets of anchor points: the moving trolley projection cable first anchor points 162, and 163, and the moving trolley projection cable second anchor points 164, 165. Two of these anchor points are on one side of the assembly (162, 164) and two are on the other side 163, 165). (The latter are not shown on the figures, but are placed just opposite their counterparts on the other side of the assembly). The first anchor points 162, 163 are fixed and immovable, while the second anchor points 164, 165 are attached to the moving trolley. See FIGS. 7, 8, 9, and 10. The lower support beam cap pulleys 82, 84 route the two moving trolley projection cables 160, 161 between their anchor points. See FIG. 19.

As the lower support beam 50 extends, it causes tension to increase on the two moving trolley projection cables 160, 161, which in turn causes the moving trolley 140 to travel outwards along the lower support beam 50.

Retraction of the moving trolley is analogous to extension. There are two moving trolley-retraction cables 170, 171, one on each side of the assembly. See FIGS. 7, 8, 9, and 10. These cables are anchored with two sets of anchor points: the moving trolley retraction cable first anchor points 172, 173, and the moving trolley projection cable second anchor points 174, 175. Two of these anchor points are on one side of the assembly (172, 174) and two are on the other side 173, 175. (The latter are not shown on the figures, but are placed just opposite their counterparts on the other side of the assembly). The first anchor points 172, 173 are fixed and immovable, while the second anchor points 174, 175 are attached to the moving trolley. See FIGS. 7, 8, 9, and 10. The beam anchor pulley assembly 75 routes the two moving trolley retraction cables 170, 171 between their anchor points. See FIG. 13

As the lower support beam 50 retracts, it causes tension to increase on the two moving trolley retraction cables 170, 171, which in turn causes the moving trolley 140 to travel back into the vehicle along the lower support beam 50.

The present invention also includes a system for raising and lowering the dynamometer or other load. This system includes a load hydraulic cylinder 180, which is held by the moving trolley 140. See FIGS. 7, 8, 17 and 18. The load hydraulic cylinder 180 should provide sufficient pressure to lift a heavy dynamometer, and its rod should extend far enough to lower the dynamometer all the way to the ground. In one embodiment, this cylinder can be purchased from Lion Hydraulics, 2038 Colins Blvd, Austell, Ga., 30001, model number 639652 (Lion 30th24-150). The hydraulic pressure for this cylinder is developed by a 24 V DC electric motor and pump connected to a hydraulic reservoir, and all of the components of this hydraulic system are installed on the vehicle. Controls for the load hydraulic cylinder 180 may also be in the vehicle.

A load cylinder slide 182 with a load cylinder pulley 184 is attached to the rod of the load hydraulic cylinder 180. See FIGS. 7, 8, and 17. This load cylinder slide 182 also is attached to the lower support beam 50, and it travels along on the lower support beam 50 as the rod of the load hydraulic cylinder 180 extends and retracts. See FIGS. 7, 8.

To power the load hydraulic cylinder 180, load cylinder hydraulic cables 190, 192 are routed from their origin point 198 to their terminus point 200 through the beam anchor pulley assembly 75. See FIGS. 7, 8, and 13.

To raise or lower the dynamometer or other load, the load cable 210 is attached to the load using the load hook 214. See FIGS. 7, 8. As the load hydraulic cylinder 180 extends, the load is lifted, and when the load hydraulic cylinder 180 retracts, the load is lowered.

In operation, the dynamometer is typically laid on the floor of the vehicle until it is ready to be deployed. In one embodiment, the lifting assembly is oriented diagonally across the vehicle, and the dynamometer may be laid out roughly parallel to the dynamometer. See FIG. 1. The dynamometer is then attached to the lifting assembly using the load hook 214, and the load is lifted to an appropriate height. The dynamometer can then be rotated as necessary to best fit out of the opening 16.

Using the hydraulic controls, the lower support beam 50 is extended out of the opening 16, and the moving trolley 140 travels along the lower support beam 50, carrying the dynamometer.

When the lower support beam is fully extended, the dynamometer can then be lowered for use. As it is being lowered, the orientation of the dynamometer can be adjusted using a guiding rod or the operator's hands. The dynamometer can then be set up for use, and once the testing is completed, the test results can be stored or even transmitted using a satellite internet connection. Thus, using the present invention, the dynamometer is capable of substantially immediate use after unloading, where it is understood that "substantially immediate use" includes the time necessary for basic set-up.

As it it can be seen, the present invention offers a number of advantages over previous technology. Rather than requiring all drivers to travel to the smog testing stations (thereby increasing the smog problem), with the present invention the testing facility can come to the vehicles, thereby greatly improving the convenience of emissions testing.

One skilled in the art will appreciate that the present invention can be practiced by other than the preferred embodiments, which are presented for purposes of illustration and not of limitation.

We claim:

1. A portable dynamometer station, comprising:
   a vehicle;
   a lifting assembly at least partially within said vehicle, said lifting assembly capable of moving a dynamometer out of said vehicle and onto the ground for substantially immediate use; and
   a dynamometer within said vehicle.

2. The portable dynamometer station according to claim 1, additionally comprising a processing unit for displaying results of emissions testing.

3. The portable dynamometer station according to claim 2, wherein said lifting assembly comprises:
   an upper support beam;
   a lower support beam below said upper support beam; and
   a moving trolley for transporting said dynamometer, said moving trolley attached to said lower support beam.

4. The portable dynamometer according to claim 3, wherein said lower support beam moves relative to said upper support beam.

5. The portable dynamometer according to claim 4, wherein said moving trolley travels along said lower support beam.

6. The portable dynamometer station according to claim 5, additionally comprising a pedestal for supporting the weight of said lifting assembly and said dynamometer.

7. A lifting assembly, comprising:
   an upper support beam;
   a tower support beam below said upper support beam;
   a trolley moving on said lower support beam;
   a first cylinder with rod for moving said lower support beam relative to said upper support beam, and for moving said trolley relative to said lower support beam; and
   a second cylinder for raising or lowering a load from said lower support beam.

8. The lifting assembly according to claim 7, wherein for every inch of movement by said rod, said lower support beam moves approximately two inches, and said trolley moves approximately four inches.

9. The lifting assembly according to claim 8, additionally comprising a second cylinder for raising a load to said lower support beam.

10. The lifting assembly according to claim 9, additionally comprising a beam anchor connecting said lower support beam and said upper support beam.

11. The lifting assembly according to claim 10, additionally comprising a beam cap on one end of said lower support beam.

12. The lifting assembly according to claim 11, additionally comprising a main support supporting said upper beam.

13. A method for unloading dynamometer from a vehicle, comprising:
   providing
      a lifting assembly comprising
         an upper support beam;
         a lower support beam below said upper support beam; and
         a moving trolley for unloading said dynamometer, said moving trolley attached to said lower support beam; and
      a vehicle with an opening and a dynamometer inside;
   attaching said dynamometer to said moving trolley;
   raising said dynamometer using said lifting assembly;
   transporting said dynamometer out of said opening using said lifting assembly;
   lowering said dynamometer using said lifting assembly; and
   setting up said dynamometer for use.

* * * * *